April 26, 1938.　　　H. C. BOWEN　　　2,114,992
FLUID PRESSURE PRODUCING DEVICE
Filed Dec. 14, 1935　　　2 Sheets-Sheet 2

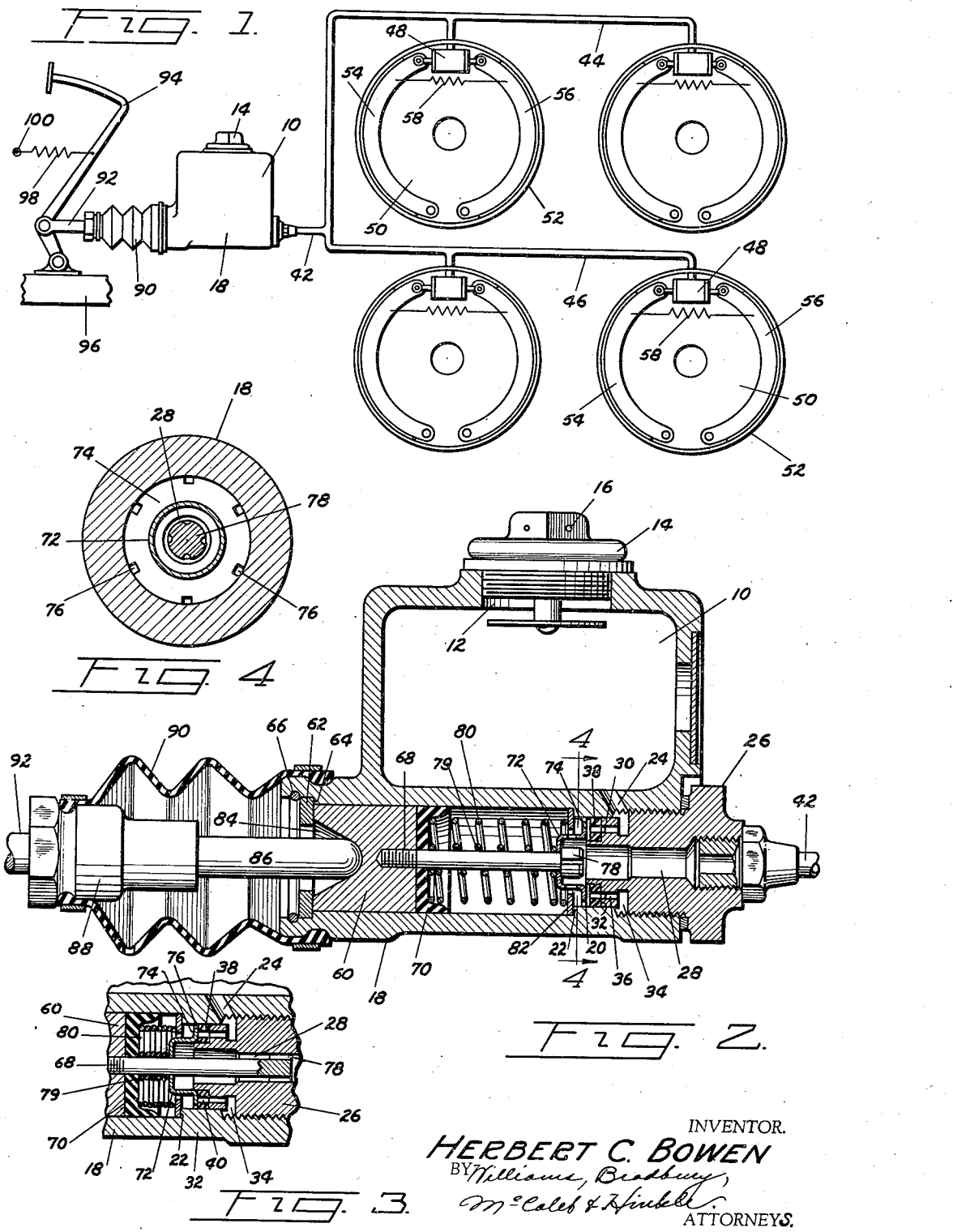

INVENTOR.
HERBERT C. BOWEN
BY
Williams, Bradbury, McCaleb & Hinkle
ATTORNEYS.

Patented Apr. 26, 1938

2,114,992

UNITED STATES PATENT OFFICE 2,114,992

FLUID PRESSURE PRODUCING DEVICE

Herbert C. Bowen, Detroit, Mich., assignor to Hydraulic Brake Company, Detroit, Mich., a corporation of California Application December 14, 1935, Serial No. 54,523

8 Claims. (Cl. 60—54.6)

This invention relates to fluid pressure braking systems.

Broadly the invention comprehends a fluid pressure brake system for a motor vehicle wherein a fluid pressure producing device is connected by fluid pressure delivery pipes or conduits to fluid pressure actuated motors arranged for the actuation of braking elements associated with rotatable drums.

The invention resides more particularly in a fluid pressure producing device including a fluid reservoir, a cylinder supplied therefrom, and means in the cylinder for controlling the flow of fluid from the reservoir to the cylinder.

An object of the invention is to provide positive control of fluid from a reservoir to a cylinder.

Another object of the invention is to provide a fluid pressure producing device including a reservoir, a cylinder supplied therefrom, and a piston movable in the cylinder, and means operated by movement of the piston for controlling the flow of fluid between the reservoir and the cylinder.

Other objects of the invention will appear from the following description taken in connection with the drawings forming a part of this specification, and in which,—

Fig. 1 is a schematic view of a fluid pressure brake system embodying the invention;

Fig. 2 is a vertical sectional view of the fluid pressure producing device;

Fig. 3 is an enlarged detail view in section of the valve mechanism in closed position;

Fig. 4 is a sectional view taken substantially on line 4—4, Fig. 2; and

Figure 5:
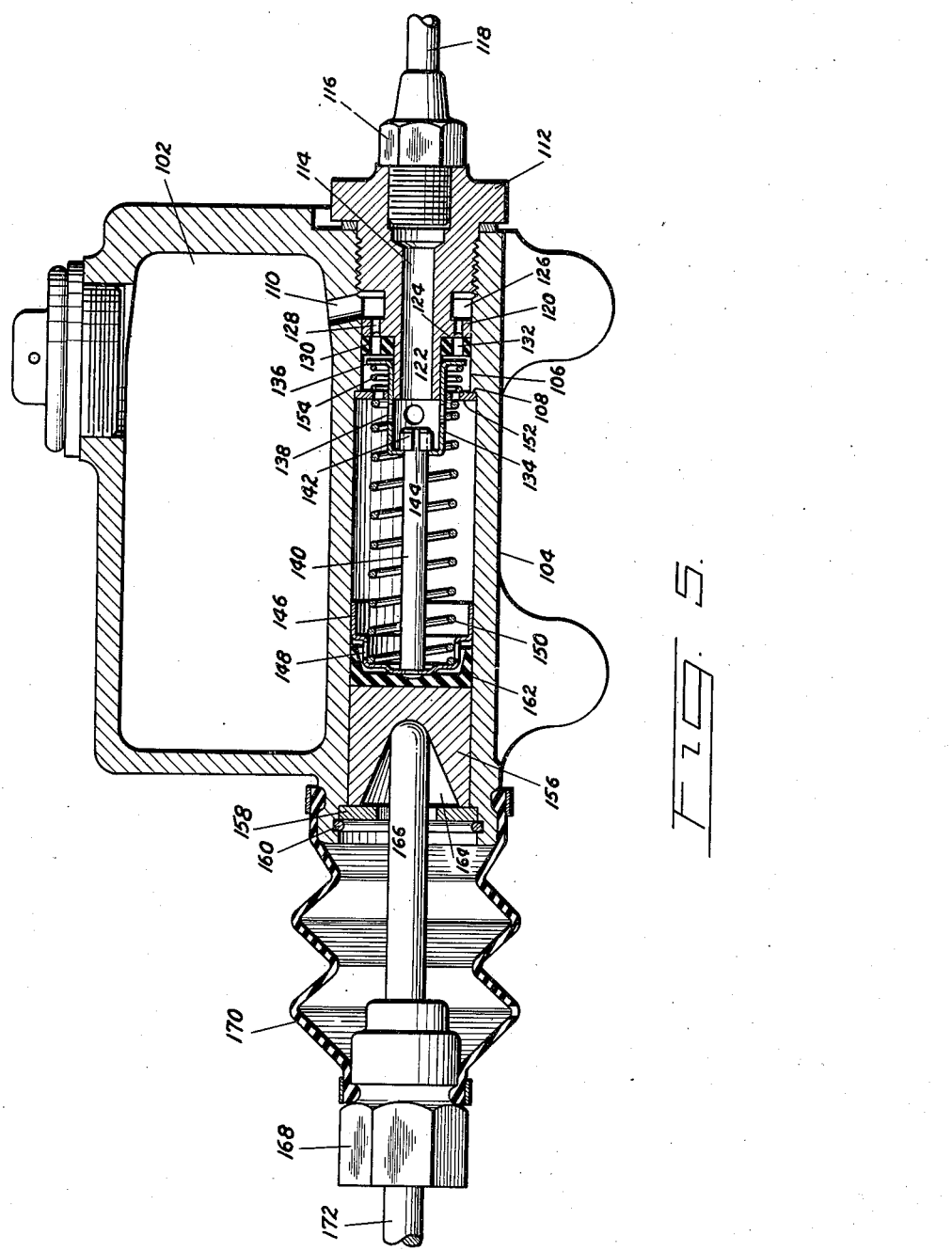
Fig. 5 is a modified form of the fluid pressure producing device including the valve mechanism.

Referring to the drawings for more specific details of the invention, 10 represents a reservoir having a filling opening 12 which may be closed as by a plug 14 having openings 16 for venting the reservoir to the atmosphere. A cylinder 18 formed in the bottom of the reservoir has a section 20 reduced in diameter which forms in conjunction with the wall of the cylinder a shoulder 22, and a port in this reduced section provides communication between the reservoir and the cylinder.

A detachable head 26 threaded into the cylinder has an axial bore providing a discharge port 28 for the cylinder and a reduced portion 30 fitting snugly in the reduced section 20 of the cylinder. The reduced portion 30 is cut away to provide a shoulder 32, and a circumferential groove 34 communicates with the port 24. This reduced portion also has a plurality of spaced ports 36 providing communications between the groove 34 and the cylinder 18, and seated on the shoulder 32 is a flexible washer 38 having a plurality of openings 40 registering with the openings 36, the object of which will hereinafter appear.

A fluid pressure delivery pipe or conduit 42 connected to the discharge port 28 has branches 44 and 46 connected respectively to fluid pressure actuated motors 48 for the actuation of the brakes associated with the wheels of a motor vehicle. The motors are arranged in pairs, one pair for the actuation of the brakes associated with the front wheels of the vehicle and the other pair for actuation of the brakes associated with the rear wheels of the vehicle.

The brakes may be of the conventional type including a fixed support or backing plate 50, a rotatable drum 52 associated therewith, interchangeable friction elements or shoes 54 and 56 pivoted on the backing plate, and a fluid pressure actuated motor corresponding to the motors 48 mounted on the backing plate between the separable ends of the shoes 54 and 56 and operative to spread the shoes into engagement with the drum 52 against the resistance of a retractile spring 58 connecting the shoes.

A piston 60 reciprocable in the cylinder 18 is retained against displacement by a washer 62 seated on an annular shoulder 64 in the open end of the cylinder and is secured in position by a retaining ring 66 fitted in a circumferential groove in the wall of the cylinder. This piston carries a pin 68 protruding axially from its head, and a leak-proof cup 70 seated on the head has a concentric opening for the reception of the pin. A thimble 72 sleeved on the rod has a flange 74 adapted to seat on the washer 38 and spaced peripheral notches 76 for the passage of fluid. This thimble is held against displacement by a head 78 on the pin 68, and the head is provided with longitudinal grooves for the free passage of fluid. A spring 79 sleeved on the pin 68 between the leak-proof cup 70 and the thimble 62 yieldingly retains the thimble against the head on the pin, and a spring 80 interposed between the cup 70 and a washer 82 seated on the annular shoulder 22 serves to retain the cup against displacement and to return the piston to its retracted position.

A recess 84 in the back of the piston receives one end of a thrust rod 86 on the other end of which is a coupling 88 connected by a boot 90 to the open end of the cylinder for the exclusion of dust and other foreign substances. A rod 92 connects the coupling to a foot pedal lever 94 pivoted on a suitable support 96 and connected by a retractile spring 98 to a fixed support 100.

Assuming that the system is filled with fluid, upon depressing the foot pedal lever force is transmitted from this lever to the piston 60 to move the piston on its compression stroke. During the initial movement of the piston on its compression stroke, the spring 80 is compressed, the head on the pin 68 carried by the piston enters the discharge port 28, and simultaneously therewith the flange 74 of the thimble 72 seats on the flexible washer 38 and closes the ports 36. The flange 74 is urged against its seat by the spring 79, interposed between the leak-proof cup 70 and the thimble 72, to cut off communication between the cylinder 18 and the reservoir 10.

Upon further movement of the piston on its compression stroke, the fluid in the cylinder is displaced therefrom, through the port 28 and fluid pressure delivery pipe 42 and its branches 44 and 46 to the fluid pressure actuated motors 48, causing actuation of the motors with the resultant movement of the shoes 54 and 56 into engagement with the drums against the resistance of the retractile springs 58 connecting the shoes.

Upon release of the applied force the foot pedal lever 94 is returned to its normal position under the influence of the retractile spring 98, and the piston 60 is moved to its retracted position under the influence of the spring 80. As the piston moves to its retracted position, pressure on the spring 79 gradually diminishes until the head 78 on the pin engages the thimble 72. As the piston 60 moves to its retracted position, vacuum is created in the cylinder 18. This results in movement of the thimble 72 against the resistance of the spring 79, resulting in lifting the flange 74 on the thimble from its seat on the flexible washer 38 and uncovering the ports 36. Upon uncovering the ports 36 fluid is drawn from the reservoir 10, through the port 24, the groove 34 and the port 36 into the cylinder 18. Simultaneous with this movement of the fluid, a quantity of the fluid is returned to the cylinder 18 from the fluid pressure actuated motors 48 under the influence of retractile spring 58 connecting the shoes 54 and 56 of the respective brakes. The quantity of fluid received by the cylinder is in excess of the quantity required to completely fill the cylinder, and this excess fluid is returned through the port 36, the groove 34, and the port 24 to the reservoir.

A modification of the invention is illustrated in Fig. 5 wherein a reservoir 102 of the conventional type has at its base a cylinder 104 having a section of reduced cross-sectional area 106 providing in conjunction with the cylinder an annular shoulder 108, and the cylinder has a port 110 providing a communication between the cylinder and the reservoir.

A detachable head 112 threaded in the cylinder has an axial bore providing a discharge port 114 for the cylinder, and a coupling 116 threaded into the discharge port connects thereto a fluid pressure delivery pipe 118 corresponding to the fluid pressure delivery pipe 42 of the preferred embodiment of the invention. The head 112 has a part 120 fitted snugly in the reduced section 106, and this part is cut away to provide a concentric sleeve 122 forming in conjunction with the part 120 a shoulder 124. This reduced portion is also provided with a circumferential groove 126 communicating with the port 110 and a plurality of spaced openings 128 providing communications between the groove 126 and the cylinder, and seated on the shoulder is a flexible washer 130 having spaced openings 132 registering with the openings 128.

A thimble 134 mounted for reciprocation on the sleeve 122 has a flange 136 adapted to seat on the flexible washer 130 to close the openings 128 and 132. The wall of the thimble is apertured as at 138 for the free passage of fluid, and the head of the thimble has an opening for the reception of a pin 140 having on one end thereof a head 142 positioned in the thimble and longitudinally slotted as at 144 for the passage of fluid. The other end of this pin is suitably connected to a metallic cup 146 slidable in the cylinder and provided with suitable openings 148 for the passage of fluid. A spring 150 is interposed between the cup 146, and a perforated washer 152 seated on the shoulder 108 and a spring 154 of less tensile strength than the spring 150 is interposed between the washer 152 and the flange 136 on the thimble 134.

A piston 156 reciprocable in the cylinder is retained against displacement by a washer 158 seated on a shoulder in the open end of the cylinder and held in position by a retaining ring 160 seated in a continuous groove in the wall of the cylinder. The piston has on its head a leak-proof cup 162, and seated on this cup is the metallic cup 146 urged against the cup by the spring 150.

A recess 164 in the back of the piston receives one end of a thrust pin 166 having on its other end a coupling 168 connected by a flexible boot 170 to the open end of the cylinder for the exclusion of dust and other foreign substances. The coupling receives one end of a rod 172, the other end of which may be connected to a foot pedal lever corresponding to the foot pedal lever 94 of the preferred embodiment of the invention.

The mode of operation of this modification of the invention is substantially identical with that of the preferred embodiment, and hence needs no explanation.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid pressure producing device comprising a cylinder having inlet and discharge ports, a piston reciprocable in the cylinder, a valve located in the cylinder and controlling the inlet port, said valve operative to close upon the compression stroke of the piston and to open upon the retractile stroke of the piston, a spring in the cylinder for closing the valve, and means for normally maintaining said spring compressed and retaining the valve in open position.

2. A fluid pressure producing device comprising a cylinder having inlet and discharge ports, a piston reciprocable in the cylinder, a flap valve located in the cylinder and controlling the inlet port, said valve operative to close on the compression stroke and to open on the retractile stroke of the piston, a spring in the cylinder for closing the valve, means for returning the piston to its retracted position, including means for maintaining the spring compressed and retaining the valve in open position, and means for actuating the piston.

3. A fluid pressure producing device comprising a cylinder having inlet and discharge ports, a piston reciprocable in the cylinder, a valve in the cylinder controlling the inlet port, a spring in the cylinder urging the valve to its seat, a spring in the cylinder urging the valve from its seat, means cooperating with the piston for normally maintaining the first mentioned spring compressed, and means for actuating the piston.

4. A fluid pressure producing device comprising a cylinder having inlet and discharge ports, a piston reciprocable in the cylinder, a flap valve located in the cylinder and controlling the inlet port, a spring in the cylinder for urging the valve to its seat, a spring of greater tensile strength located in the cylinder for urging the valve from its seat and for returning the piston to its retracted position, and means for actuating the piston.

5. A fluid pressure producing device comprising a cylinder having inlet and discharge ports, a piston reciprocable in the cylinder, a flap valve for control of the inlet port, a pin on the head of the piston supporting the valve, springs sleeved on the pin, one for urging the valve to open position and for returning the piston to its retracted position, and the other for urging the valve to closed position, and means for actuating the piston.

6. A fluid pressure producing device comprising a reservoir, a cylinder having an inlet port communicating with the reservoir, a head for the cylinder having an opening providing a discharge port for the cylinder, a groove communicating with the inlet port, said groove being coaxial with said cylinder, a plurality of ports providing communications between the groove and the cylinder, a flap valve for controlling the ports between the groove and the cylinder, means on the head of the piston for control of the valve including means for returning the piston to its retracted position, and means for actuating the piston.

7. A fluid pressure producing device comprising a reservoir, a cylinder having an inlet port communicating with the reservoir, a piston reciprocable in the cylinder, a head on the cylinder having an opening providing a discharge port for the cylinder, a groove communicating with the inlet port and a plurality of spaced ports providing communications between the groove and the cylinder, a flap valve for control of the spaced ports, a pin on the head of the piston supporting the valve, springs sleeved on the pin, one for urging the valve to its seat, and the other for urging the valve from its seat and for urging the piston to its retracted position, and means for actuating the piston.

8. A pressure producing device comprising a reservoir, a cylinder having an inlet port communicating with the reservoir, a piston reciprocable in the cylinder, a head on the cylinder having an opening providing a discharge port for the cylinder, a groove communicating with the inlet port, said groove being coaxial with said cylinder, a plurality of spaced ports providing communications between the groove and the cylinder, a valve for control of the spaced ports, a cup seated on the piston, a rod connecting the cup to the valve, a spring interposed between the cup and the valve, and means for actuating the piston.

HERBERT C. BOWEN.